(12) United States Patent
Cronin

(10) Patent No.: US 9,538,062 B2
(45) Date of Patent: Jan. 3, 2017

(54) CAMERA MANAGEMENT SYSTEM

(71) Applicant: GrandiOs Technologies, LLC, Wilmington, DE (US)

(72) Inventor: John Cronin, Bonita Springs, FL (US)

(73) Assignee: GRANDIOS TECHNOLOGIES, LLC, Charleston, SC (US)

( * ) Notice: Subject to any disclaimer, the term of this patent is extended or adjusted under 35 U.S.C. 154(b) by 0 days.

(21) Appl. No.: 14/622,412

(22) Filed: Feb. 13, 2015

(65) Prior Publication Data

US 2015/0358526 A1  Dec. 10, 2015

Related U.S. Application Data

(60) Provisional application No. 62/007,751, filed on Jun. 4, 2014.

(51) Int. Cl.
*H04N 5/232* (2006.01)

(52) U.S. Cl.
CPC ................ *H04N 5/23206* (2013.01)

(58) Field of Classification Search
CPC ................................. H04N 5/23206
USPC ............. 348/211.99–211.14, 333.01–333.06
See application file for complete search history.

(56) References Cited

U.S. PATENT DOCUMENTS

| | | | |
|---|---|---|---|
| 6,499,016 B1 * | 12/2002 | Anderson | G06F 17/30781 704/235 |
| 7,544,000 B2 * | 6/2009 | Mayuzumi | 396/419 |
| 8,484,728 B2 | 7/2013 | De Atley | |
| 8,589,667 B2 | 11/2013 | Mujtaba et al. | |
| 8,611,930 B2 | 12/2013 | Louboutin et al. | |
| 8,620,344 B2 | 12/2013 | Huang et al. | |
| 8,626,465 B2 | 1/2014 | Moore et al. | |
| 8,630,216 B2 | 1/2014 | Deivasigamani et al. | |
| 8,660,501 B2 | 2/2014 | Sanguinetti | |
| 8,706,044 B2 | 4/2014 | Chang et al. | |
| 8,724,723 B2 | 5/2014 | Panicker et al. | |
| 8,750,207 B2 | 6/2014 | Jeong et al. | |

(Continued)

FOREIGN PATENT DOCUMENTS

WO   WO 2008/107733   9/2008

OTHER PUBLICATIONS

Jackson, William, "App would give 911 operators control of callers' smart phones", GCN Technology, Tools and Tactics for Public Sector IT, Jun. 12, 2013.

(Continued)

*Primary Examiner* — Anthony J Daniels
(74) *Attorney, Agent, or Firm* — Polsinelli LLP

(57) ABSTRACT

Systems and methods are provided for restricting and allowing the initiation of operations on an electronic device according to settings of management control functions on the electronic device. In certain instances, operations may be initiated after the electronic device determines, detects, or receives an authorized event. The initiation of operations on the electronic device may also be prevented after the electronic device determines, detects, or receives an unauthorized event. A user of an electronic device consistent with the invention may set settings that identify whether a remote electronic device or user of a remote electronic device may initiate a camera function. Preferred embodiments of the invention are implemented in part or entirely within the operating system of a smartphone, or a cellphone.

13 Claims, 7 Drawing Sheets

(56) References Cited

U.S. PATENT DOCUMENTS

| | | | |
|---|---|---|---|
| 8,793,094 B2 | 7/2014 | Tam et al. | |
| 8,816,868 B2 | 8/2014 | Tan et al. | |
| 8,831,529 B2 | 9/2014 | Toh et al. | |
| 8,831,655 B2 | 9/2014 | Burchill et al. | |
| 8,836,851 B2 | 9/2014 | Brunner | |
| 8,843,158 B2 | 9/2014 | Nagaraj | |
| 8,849,308 B2 | 9/2014 | Marti et al. | |
| 8,862,060 B2 | 10/2014 | Mayor | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 2003/0067543 A1* | 4/2003 | Okada | H04N 7/181 348/207.1 |
| 2007/0254640 A1 | 11/2007 | Bliss et al. | |
| 2009/0170532 A1* | 7/2009 | Lee et al. | 455/456.3 |
| 2012/0009896 A1* | 1/2012 | Bandyopadhyay et al. | 455/411 |
| 2012/0317609 A1* | 12/2012 | Carrara et al. | 726/1 |
| 2013/0110565 A1 | 5/2013 | Means et al. | |
| 2013/0120591 A1 | 5/2013 | Bednarczyk | |
| 2013/0203387 A1 | 8/2013 | Bennett et al. | |
| 2013/0303192 A1 | 11/2013 | Louboutin | |
| 2013/0317835 A1 | 11/2013 | Mathew | |
| 2013/0328917 A1 | 12/2013 | Zambetti et al. | |
| 2013/0331087 A1 | 12/2013 | Shoemaker | |
| 2013/0331118 A1 | 12/2013 | Chhabra | |
| 2013/0331137 A1 | 12/2013 | Burchill | |
| 2013/0332108 A1 | 12/2013 | Patel | |
| 2013/0332156 A1 | 12/2013 | Tackin | |
| 2013/0346608 A1* | 12/2013 | Tung | H04L 47/70 709/225 |
| 2014/0062773 A1 | 3/2014 | MacGougan | |
| 2014/0065962 A1 | 3/2014 | Le | |
| 2014/0071221 A1 | 3/2014 | Dave | |
| 2014/0105084 A1 | 4/2014 | Chhabra | |
| 2014/0139380 A1 | 5/2014 | Ouyang | |
| 2014/0141803 A1 | 5/2014 | Marti | |
| 2014/0162628 A1 | 6/2014 | Bevelacqua | |
| 2014/0167794 A1 | 6/2014 | Nath | |
| 2014/0168170 A1 | 6/2014 | Lazarescu | |
| 2014/0171114 A1 | 6/2014 | Marti | |
| 2014/0180820 A1 | 6/2014 | Louboutin | |
| 2014/0191979 A1 | 7/2014 | Tsudik | |
| 2014/0200053 A1 | 7/2014 | Balasubramanian | |
| 2014/0222335 A1 | 8/2014 | Piemonte | |
| 2014/0232633 A1 | 8/2014 | Shultz | |
| 2014/0232634 A1 | 8/2014 | Piemonte | |
| 2014/0247279 A1 | 9/2014 | Nicholas | |
| 2014/0247280 A1 | 9/2014 | Nicholas | |
| 2014/0269562 A1 | 9/2014 | Burchill | |
| 2014/0274150 A1 | 9/2014 | Marti | |
| 2014/0283135 A1 | 9/2014 | Shepherd | |
| 2014/0293959 A1 | 10/2014 | Singh | |
| 2014/0364089 A1 | 12/2014 | Lienhart | |
| 2014/0364148 A1 | 12/2014 | Block | |
| 2014/0365120 A1 | 12/2014 | Vulcano | |
| 2015/0011242 A1 | 1/2015 | Nagaraj | |
| 2015/0026623 A1 | 1/2015 | Horne | |
| 2015/0031397 A1 | 1/2015 | Jouaux | |

OTHER PUBLICATIONS

"Taking Pictures Just Got Easier with Droid's New User Interface", https://insidersguide.vzw.com/tech-smarts/new-droid-camera-ui, Jan. 8, 2014.

PCT Application No. PCT/US2015/033198 International Search Report and Written Opinion mailed Sep. 3, 2015.

* cited by examiner

CAMERA MANAGEMENT SYSTEM

CROSS-REFERENCE TO RELATED APPLICATIONS

The present application claims the priority benefit of U.S. provisional application No. 62/007,751 filed Jun. 4, 2014 and entitled "Camera Management System," the disclosure of which is incorporated herein by reference.

BACKGROUND OF THE INVENTION

1. Field of the Invention

This invention relates to the field of smart mobile devices and their associated controls.

2. Description of the Related Art

Handheld electronic devices (e.g., smartphones, or cell phones) typically have at least one built-in camera for capturing still images or video. There are also applications made for handheld electronic device applications that are available today. Examples of such applications that use a camera include FaceTime™, and Remote Camera™. However, unlike other operating system level functions of these handheld electronic devices, such as speaker and sound controls or accelerometer activity controls, the camera function is not currently separately controlled in the operating system (OS) settings function of such devices. Because the camera function is not separately controlled in the OS settings function, user-controlled settings for the camera function are currently limited. For example, there is no local security setting to ensure that the camera(s) is turned off. In another example, there is no mechanism to automatically turn a camera on in response to a real-time event or $3^{rd}$ party application. In yet another example, there is no mechanism to systematically cross the camera function with other OS functions or other application functions. In yet another example, there is no mechanism to allow a $3^{rd}$ party to remotely access the camera.

There is, therefore, a need in the art for new systems and methods for managing the camera functions of an electronic device such as a smartphone.

SUMMARY OF THE CLAIMED INVENTION

Embodiments of the present invention include methods, systems, and non-transitory computer-readable storage media for controlling camera and other functions of an electronic device. An electronic device with a camera management system may be local to a user and is physically distinct from other electronic devices with which it communicates. These other physically distinct electronic devices are referred to herein as external electronic devices. In certain instances, the user of the electronic device configures settings in the operating system (OS) of the electronic device to allow or restrict the external electronic devices from being able to manipulate one or more features of the electronic device. For example, the user could configure his smartphone to allow an email received from a particular email address, and only an email from that particular email address to turn a camera on in the user's smartphone.

In certain embodiments of the present invention, a user interface may be displayed on a local display of a user's electronic device. The user's electronic device then will receive a selection of a management control function through the local user interface. The first selection can restrict or allow the initiation of operations on the user's electronic device. Typically, the user of the electronic device will change settings relating to the management control function based on the user's preferences, and the electronic device will receive and store those settings. When those settings are implemented in part or entirely in the operating system (OS) of the electronic device, an external electronic device communicating with the user's electronic device will have difficulty hacking into and changing those OS settings. Camera management, thus, may provide increased functionality and increased security that are not currently available in the marketplace.

Settings set by the user of the electronic device may be used to identify events received by the electronic device, where some of those events may be unauthorized and others may be authorized. Camera management may restrict the electronic device from initiating operations relating to the management control function after an unauthorized event. Camera management may further allow the electronic device to initiate operations relating to the management control function after an authorized event. In certain instances, the events received by the electronic device are received from a remote, external electronic device (e.g., performing an operation for a third party).

Management control functions consistent with the invention include turning a camera on, turning a camera off, controlling whether a light source in the electronic device is illuminated, turning the camera on after a real-time event, setting a camera setting, and sending a real-time feed from the electronic device.

Authorized events consistent with the invention include the electronic device determining that the time has reached a scheduled time, that the location of the electronic device is within a first distance from a first location, or that the electronic device is no longer within a second distance from a second location.

Furthermore, authorized events consistent with the invention may also include the electronic device detecting that a sound decibel level reached a threshold level, or that an acceleration level reached a threshold level.

In certain instances, authorized events include the electronic device receiving an electronic communication from an authorized source, a trigger event from an sensor external to the electronic device, a first word or phrase spoken by a person, or an audio text including a second word or phrase. An authorized source of an electronic communication may be, in certain instances, identified by an email address or by the user name of the sender of the communication. In other instances, an authorized source may be identified by identifying the external electronic device that was used to send the communication. This may be determined using an IP address, a phone number, or other identifier associated with an external electronic device.

Unauthorized events consistent with the invention include the electronic device receiving an electronic communication from an external electronic device that has not been authorized in the settings of the management control function, receiving an electronic communication from a blocked sender, or receiving a trigger event from an unidentified sensor external to the electronic device.

Camera management may thus enable a user of an electronic device to set settings that allow or restrict how camera and other functions can be managed on a user device. The user of the electronic device may restrict camera function such that the camera may only be turned on and used locally. Alternatively, the settings of the management control function may allow camera functions to be controlled remotely by any authorized external electronic device, or by an authorized sender of a communication. Camera management may further enable both local and remote control of the camera. Furthermore, in certain instances, authorized remote electronic devices or users may change or update settings of the management control function.

DETAILED DESCRIPTION

Figure 1:
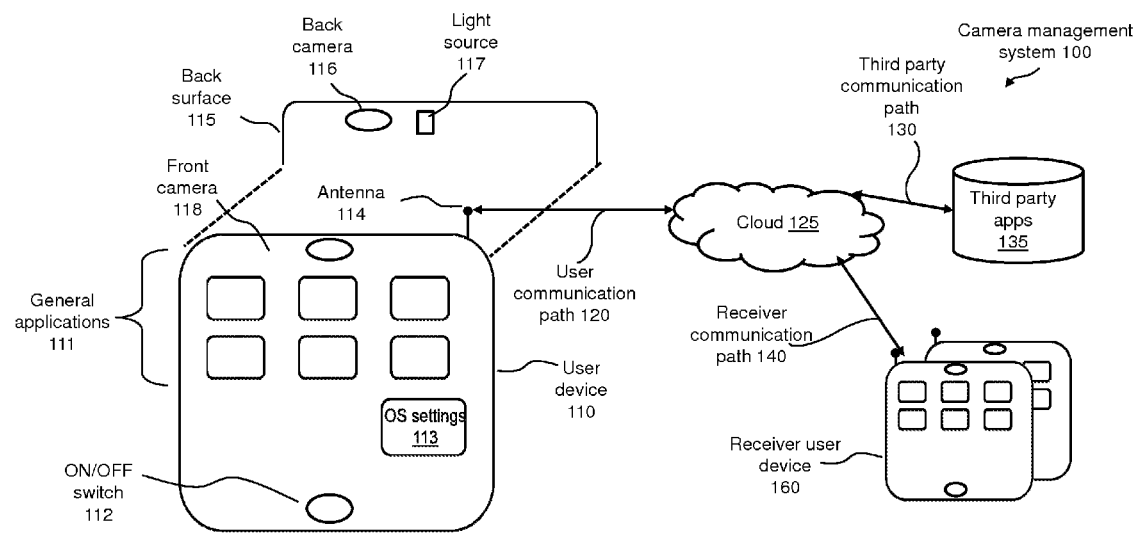
FIG. 1 illustrates a diagram of an exemplary camera management system for managing camera functions of a user device.

Aspects of the present invention include systems, methods, and a non-transitory computer readable storage medium for controlling camera and other functions of an electronic device. Typically, an electronic device is local to a user and physically distinct from other electronic devices with which it communicates. These other physically distinct electronic devices are referred to herein as external electronic devices. In certain instances, the user of the electronic device configures settings in the operating system (OS) of the electronic device to allow or restrict the external electronic devices from being able to manipulate one or more features of the electronic device. For example, the user could configure his smartphone to allow an email received from a particular email address, and only an email from that particular email address to turn a camera on in the user's smartphone.

Camera management may be incorporated into electronic devices, such as general purpose computers, mobile phones, smartphones, personal digital assistants (PDAs), portable computing devices (e.g., laptop, netbook, tablets), desktop computing devices, handheld computing device, or any other type of computing device capable of communicating over a communication network. In certain instances, the electronic device may also be configured to access data from, or upload data to other storage media, such as memory cards or disk drives as may be appropriate. The electronic device may include standard hardware computing components such as network and media interfaces, non-transitory computer-readable storage (memory), and processors for executing instructions that may be stored in memory.

Similarly, the external electronic devices may be any of the aforementioned devices, be a server, or be a computing device that resides in a cloud computing environment. An external electronic device is any electronic or computing device that may communicate to the electronic device through a wireless or wired data communication network interface. The external electronic device and the electronic device may both be smartphones that may communicate through a 4G wireless network. Alternatively, the external electronic device may be a computer, and the electronic device may be a smartphone. In another example, the external electronic device and the electronic device may both be computers that communicate though a wired data communication network. Thus, the electronic device and the external electronic devices are physically separate devices even though they may be connected with a wire.

Typically, a user of the electronic device will select a management control function through a user interface displayed on the electronic device. After selecting a management control function, the user may adjust settings that restrict the electronic device from initiating operations that relate to the management control function after an unauthorized event. The user may also set settings that allow the initiation of operations relating to the management control function after an authorized event. In certain instances, a user may restrict the electronic device from initiating operations after receiving a communication from a particular external electronic device (an unauthorized electronic device), yet allow another external electronic device (an authorized electronic device) to initiate those very same operations.

Camera management may be implemented at the operating system level in a handheld electronic device, where settings relating to authorized and unauthorized events may be configured using system settings of the operating system software. Control functions may include, yet are not limited to, turning on a camera on at a specific time, turning on a camera upon receiving an alert, turning on a camera upon receiving a trigger from a sensor, turning on a camera upon interpreting information sensed by the electronic device, turning on a light, performing flash photography, or recording a video.

In certain instances, images or a real-time feed of the camera are directly uploaded to the cloud, to a third party application program running on a server, or to an external electronic device. In certain other instances, the electronic device may have two cameras, such as a first camera on the front of the electronic device and a second camera on the back of the electronic device.

In one embodiment, the camera management system provides for local control of camera functions embedded in the OS of the user device. In another embodiment, the camera management system provides for external control of camera functions embedded in the OS of the user device.

FIG. 1 illustrates a diagram of an example of a camera management system for managing camera functions of a user device locally, remotely (non-locally), or both locally and remotely. FIG. 1 shows a camera management system 100 for managing the camera functions of a user device that are consistent with the present invention. Camera management system 100 includes a user device 110, a set of general applications 111, an ON/OFF switch 112, and OS setting 113, an antenna 114, a back surface 115, a back camera 116, a light source 117, a front camera 118, a user communication path 120, a Cloud 125, a 3rd party communication path 130, a $3^{rd}$ party Apps database 135, a receiver communication path 140, and a receiver user device 160. The receiver user devices 160 depicted in the figure are external user devices, and the user device 110 is the electronic device that is local to the user.

User device 110 may be a local user device such as a smartphone, a cellular phone, or any other local user device. General applications 111 of the user device 110 may be a plurality of software applications installed on user device 110 such as Calendar, Notes, Messages, Camera, Face- Time™, Weather, etc., on an iPhone. Android and other devices may have corresponding applications. The ON/OFF switch 112 of the user device 110 may be a switch to turn the user device on or off. In certain instances the ON/OFF switch 112 is a hardware button on the front surface of user device 110.

The OS setting 113 of the user device 110 may be a software function that opens a display that lists operating system (OS) functions. Once selected, the OS setting 113 may cause the electronic device to display a user interface that includes various management control functions that a user may configure. In certain instances, the OS setting 113 is displayed in a graphical user interface (GUI) of a smartphone. In other instances, the OS setting 113 may be a user interface button that opens a list of OS functions.

The antenna 114 of the user device 110 may be an antenna for transmitting GSM, UMTS, WCDMA, Wi-Fi, or Bluetooth communications. The back surface 115 of the user device 110 is shown including a back camera 116 and a light source 117. In certain instances, the back camera 116 captures still images or video from the back side of the user device. Light source 117 may be a flash that includes two light-emitting diodes (LEDs), one white and one amber as found in an iPhone's "True Tone" flash. Similarly, front camera 118 of the user device 110 may be a camera for capturing still images or video from the front side of the user device. In certain instances, the front camera 118 or the back camera 116 may be used to capture an image or video of the user when participating in a video communication service like FaceTime™.

Cloud 125 may be a scalable, distributed computing architecture connected through a communication network such as the internet. The cloud may be used to transmit real-time data communications from user device 110 to third party applications 135, or to user devices 160 that are external to the user device 110. User communication path 120 is a communication path for sending data between the user device 110 and the cloud 125. In certain instances, user communication path 120 may be a data communication link that supports TCP/IP.

3rd party apps 135 are software applications that may operate on a server. Such 3rd party apps may include, yet are not limited to, applications such as FaceTime™, Instagram™, Remote Camera™, Google™ Drive™, or Dropbox™. In certain other instances, applications used by the invention are published by 3rd party developers that are available through the Apple™ AppStore. In certain instances, 3rd party applications include a database where data on the user device 110 is backed up periodically or where image data is sent after the user device 110 detects an event.

User communication path 120, the third party communication path 130, and the receiver communication path 140 may be implemented using a wired network like Ethernet and/or a wireless network. Receiver user device 160 may be any user devices that are external to user device 110. Receiver user device 160 may be a smartphone, a cellular phone, or any other electronic device configured to receive data from user device 110 and send data to user device 110.

An example of a user interacting with the invention begins with a user turning on user device 110 using ON/OFF switch 112. After turning on the user device 110, the user may select OS settings 113 Icon in a GUI on the user device 110. At this point, a user interface may be displayed on a display of the user device 110 within which the user selects a management control function to turn front camera 118 ON or OFF. The user could also select functions to turn the back camera 116 ON or OFF.

The user may also select a management control function that authorizes camera data to be sent from user device 110 to the cloud 125 via antenna 114 and communication path 120. In certain instances, user device 110 may also receive data from the cloud 125 via communication path 120 and antenna 114. The user may also select management control functions that allow 3rd party applications 135 to set camera functions in OS settings 113. For example the 3rd party applications 135 may turn the front camera 116 on, take a photograph, and transmit that photograph through user communication path 120, through the Cloud 125, and through third party communication path to a database controlled by the $3^{rd}$ party applications 135.

The user may also select functions locally that allow one or more receiver user devices 160 to set camera functions in OS settings 113. Thus, a particular receiver user device 160 may be authorized to set camera functions in OS settings 113 in user device 110 through communication path 140 and the Cloud 125. In other instances, a user may setup functions in OS settings 113 that configure user device 110 to send camera data from user device 110 to a particular receiver user device 160 via communication path 120 and cloud 125.

Camera management may not be limited to controlling camera functions on a user device 110. The user may also be enabled to locally allow or restrict the initiation of operations on user device 110 by electronic devices that are remote from user device 110.

Figure 2:
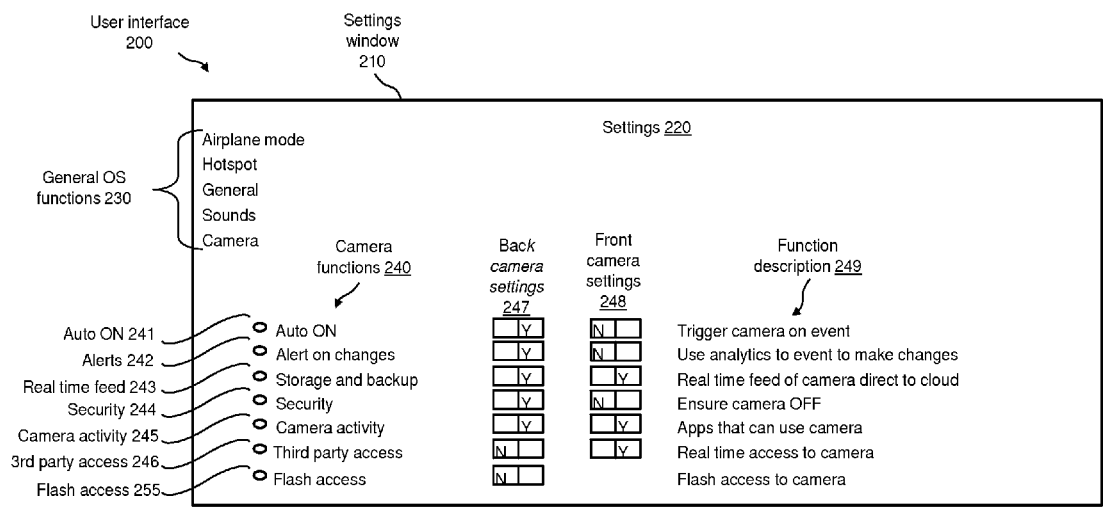
FIG. 2 illustrates an exemplary user interface for selecting and changing one or more OS function settings.

FIG. 2 illustrates an exemplary user interface for selecting and changing one or more OS function settings. User interface 200 may include a settings window 210, a settings 220 screen, a general OS functions 230, camera functions 240, an auto ON 241, alerts 242, a real-time feed 243, a security 244 function, a camera activity 245 function, a 3rd party access 246 function, a flash access 255 function, a back camera 247 function, a front camera 248 function, and a function description 249.

Settings window 210 may be a user interface containing information and interactive elements associated with selecting and changing the settings of one or more OS functions. Settings 220 allow the user to select functions available in the OS.

General OS functions 230 may be a section for displaying a list of general OS functions, including functions known in the art, such as Airplane mode, Hotspot, General, Sounds, and Camera. General OS functions 230 allows a user to open different sub-menus that control user device 110.

Similarly, camera functions 240 may be a sub-menu for displaying a list of camera functions from which a user will typically select one or more functions that control the activity of a camera. In certain instances, auto ON 241 is used to set conditions for when a camera may be turned on in response to an event. Events that the user allows to turn the camera on are thus considered authorized events. Similarly, events that the user does not allow to turn the camera on are considered unauthorized events.

Authorized events that initiate an operation on an electronic device include, yet are not limited to, events that the user device 110 determines have occurred. Examples of events may be determined based on whether the time (or date/time) has reached a scheduled time, whether the location of an electronic device is within a first distance from a first location, or whether the electronic device is no longer within a second distance from a second location.

Similarly, authorized events that initiate an operation on the user device 110 may be based on determining that a sound decibel level reaching a threshold level or that an acceleration has reached a threshold level. Authorized events may also include user device 110 receiving various inputs, such as receiving an electronic communication from an authorized source, receiving a trigger event from a sensor external to the user device 110, receiving a word or phrase spoken by a person, or receiving a word or phrase included in an audio text message.

In certain instances, an auto ON sub-menu (not shown) allows the user of the user device 110 to select or add authorized events. In this way, once selected, the camera can take a picture when a text message with the heading, "turn camera on" comes from a chosen text account. In this way, a remote event from a remote user device 160 can trigger the camera. Alternatively, the user of user device 110 may select specific events that are unauthorized. Thus, communications from a specific cell phone, smartphone, email address, or 3rd party application may be blocked from triggering the camera.

In certain instances, alert 242 may be a software function that automatically turns a camera on based on real-time data analysis of a triggering event. A triggering event may be, for example, a certain GPS range of a specified location, a certain accelerometer value, a certain spoken phrase in an audio text, or a written phrase in an email or text message from a certain contact. In such embodiments, a sub-menu (not shown) for alert 242 may allow the user to select or add certain types of trigger events.

Real-time feed 243 may be a software function used to send camera data to the cloud in real-time for storage or backup. Here again, a specific sub-menu (not shown) for setting settings relating to real-time feed 243 could allow the user to turn features related to the real-time feed 243 to be turned on or off. In certain instances, the real-time feed 243 is used in a security system. For example, a motion sensor coupled to the user device 110 may trigger the sending of a real-time feed 243 to a remote user device 160 when a motion sensor detects motion.

Security 244 may be a software function used to turn cameras securely off. Sub-menu (not shown) for the security 244 function could determine which applications will be enabled or disabled (by user selection) at a point in time. The user of the user device 110 may thus disable 3rd party applications from taking photographs, video, or other recorded content that the user may not wish to share. Such disabling prevents private content from being uploaded by 3rd party applications without permission.

Camera activity 245 may be a software function used to integrate a camera with other applications that use the camera. For example, camera activity 245 may be a function that allows 3rd party applications 135 to set camera functions in OS setting 113. Sub-menu (not shown) for the camera activity 245 may list all of the applications that can potentially use the camera. In such embodiments, the user of the user device 110 could select which 3rd party applications are allowed to change camera settings or initiate a camera function. For example, the uploading of a real-time feed 243 to a database controlled by the 3rd party applications 135 could be set to occur hourly for a duration of a minute.

Flash access control 255 may be a section for authorizing a 3rd party application to control a flash when using the camera to take a picture. In such an instance, the user of the user device 110 could allow 3rd parties to control the flash or to use the flash to illuminate an area when a real-time feed 243 is recorded.

FIG. 2 further illustrates back camera settings 247 and front camera settings 248 that may be enabled (Y) or disabled (N). Additional camera function may also be included, along with descriptions 249 that correspond to the back camera settings 247 and the front camera settings 248. The function descriptions 249 may include: trigger camera on event, use analytics to event to make changes, real-time feed of camera direct to cloud, ensure camera off, applications that can use camera, real-time access to camera, and flash access to camera. A user of user device 110 may enter yes (Y) to enable each function, or may enter no (N) to disable each function.

An example of a user using user device 110 begins by the user selecting "Camera" in general OS functions 230, after which a sub-menu of camera functions 240 and a corresponding function description 249 may be displayed. For each camera function 240, the user inputs in back camera 247 selection box, a yes (Y) or a no (N) when setting each of the camera functions for back camera 116. Likewise, for each camera function 240, the user inputs in front camera 248 selection box, a yes (Y) or a no (N) to select each of the camera functions for front camera 118. For each of these selections, the user can enter into the sub-menus to further control and define the operation of the cameras.

As illustrated, for auto ON 241 function, the user has input "Y" in back camera 247 to turn to the auto-on function on for back camera 116 and "N" in front camera 248 to turn the auto-on function off for front camera 118. For alert 242 function, the user has input "Y" in back camera 247 to turn to the alert function on for back camera 116 and "N" in front camera 248 to turn the alert function off for front camera 118. For real-time feed 243 function, the user has input "Y" in back camera 247 to turn to the real-time feed function on for back camera 116 and "Y" in front camera 248 to turn the real-time feed function on for front camera 118. For security 244 function, the user has input "Y" in back camera 247 to turn to the security function on for back camera 116 and ensure that back camera 116 is turned off and "N" in front camera 248 to turn the security function off for front camera 118 (i.e., front camera 118 is turned on). For camera activity 245 function, the user has input "Y" in back camera 247 to turn to the camera activity function on for back camera 116 and "Y" in front camera 248 to turn the camera activity function on for front camera 118. For 3rd party access 246 function, the user has input "N" in back camera 247 to turn to the 3rd party access function off for back camera 116 and "Y" in front camera 248 to turn the 3rd party access function on for front camera 118.

Figure 3:
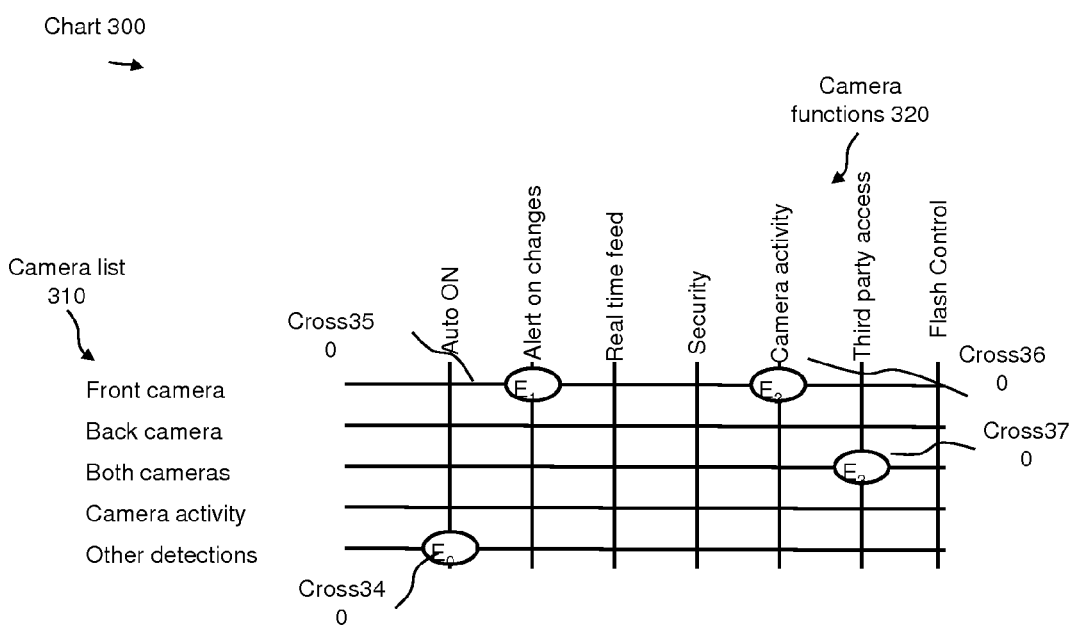
FIG. 3 is a chart illustrating exemplary camera function associated with a type of camera activity, a detected event, or with activity that a camera performs.

FIG. 3 is a chart illustrating exemplary camera functions associated with a type of camera activity, a detected event, or with activity that a camera performs. The chart of FIG. 3 includes a camera list 310 and camera functions 320. The camera list 310 includes a front camera, a back camera, both cameras, camera activity, and other detections. Each of the items in the camera list 310 includes a horizontal line that extends under each of the camera functions 320. The camera functions that may be associated with the camera activities include auto ON, alert on changes, real-time feed, security, camera activity, third party access, and flash control. Each of the items in the camera functions include a vertical line extending down past each of the items in the camera list 310. The chart further includes a plurality of potential cross points, where each horizontal line crosses through each vertical line. Cross 340 corresponds to cross point $E_0$, cross 350 corresponds to cross point $E_1$, cross 360 corresponds to cross point $E_2$, and cross 370 corresponds to cross point $E_3$. Each cross point indicates that an item on the camera list has been set up (e.g., by a user via settings) to correspond to one or more camera functions 320. Cross point $E_0$ indicates that the camera is set to turn on automatically when an "other detection" is detected by the user device 110. Cross point $E_1$ indicates that the front camera is set to take a picture when an alert on changes is received by user device 110. Examples of an alert on changes include receiving a text message from an authorized remote user.

Cross point $E_2$ indicates that a specific type of camera activity of the front camera may be initiated when the user device 110 determines that an event has occurred. For example, the front camera could take a video when a calendar event occurs or when a large accelerometer shock is detected. Thus, certain embodiments of the invention may record an accident. Cross point $E_3$ is a cross between 3rd party access and both cameras. $E_3$ represents both cameras being turned on by a 3rd party access uploading a real-time video periodically.

Figure 4A:
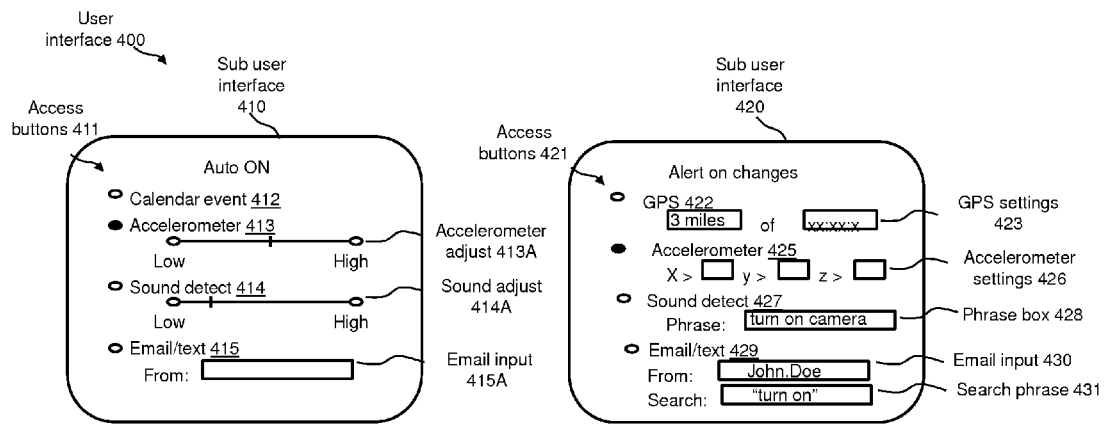
FIG. 4A illustrates exemplary user interfaces for displaying a plurality of sub-user interfaces for setting camera functions.
Figure 4B:
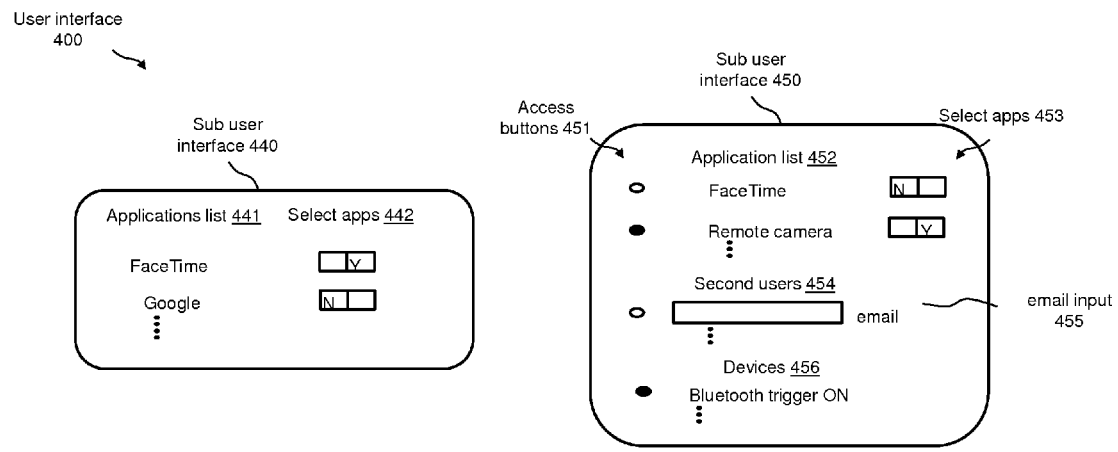
FIG. 4B illustrates additional exemplary user interfaces for displaying a plurality of sub-user interfaces for setting camera functions.

FIG. 4A illustrates exemplary user interfaces for displaying a plurality of sub-user interfaces for setting camera functions. Such user interface 400 may include a sub-user interface 410, and a sub-user interface 420. FIG. 4B illustrates additional exemplary user interfaces for displaying a plurality of sub-user interfaces for setting camera functions: sub-user interface 440 and a sub-user interface 450. Each sub-user interface shown relates to a cross point shown in chart 300 of FIG. 3.

Sub-user interface 410 may be a sub-user interface containing information and interactive elements for setting the auto ON function of a camera based on the detection of certain events that are associated with cross 340 ($E_0$) of FIG. 3. In this example, the auto ON function is determined by other detections. Sub-user interface 410 may include a plurality of access buttons 411, a calendar event 412, an accelerometer 413, an accelerometer adjust 413A, a sound detect 414, a sound adjust 414A, an email/text 415, and an email input 415A.

Access buttons 411 of sub-user interface 410 may include a plurality of access buttons, each associated with a software function that may be used to set the auto ON function. Calendar event 412 of sub-user interface 410 is a software function that automatically turns on a camera in response to a calendar entry such as a particular date and/or time. Accelerometer 413 of sub-user interface 410 is a software function that automatically turns on a camera in response to a certain pre-defined level of accelerometer activity that crosses a threshold level.

As illustrated, accelerometer adjust 413A of sub-user interface 410 has been selected. This is indicated by the darkened oval next to the accelerometer 413 feature. In certain instances, the accelerometer threshold level may be interactively adjusted to a lower or a higher setting using the accelerometer adjust 413A slider (e.g., track bar).

Sound detect 414 of sub-user interface 410 may be a software function that automatically turns on a camera in response to a pre-defined level of sound, such as a loud sound. Sound adjust 414A of sub-user interface 410 is an example of an interactive element for adjusting the sound threshold used as a trigger event. As illustrated, a slider (track bar) is depicted as the interactive element used to set the sound trigger threshold. Email/text 415 of sub-user interface 410 is a software function that automatically turns on a camera in response to receiving an email or text message sent remotely from an user authorized to trigger the auto ON function. Email input 415A of sub-user interface 410 is an input for identifying the email address of a user authorized to turn the camera on. Receiving an email from the authorized user may be an authorized event that causes the camera to take a picture and transmit it to the authorized user by email.

In operation, a user may select one or more access buttons 411 in the sub-user interface 410. The access buttons selected correspond to desired functions that the user wishes to allow or enable. In certain instances, the user may wish to automatically turn a camera on in response to a certain event (e.g., a calendar event, an accelerometer event, a sound, and/or an email or text message from a certain contact).

The darkened oval in FIG. 4A shows that accelerometer 413 is the only access button 411 that is selected in sub-user interface 410. Thus, access button 411 associated with accelerometer 413 indicates that the accelerometer function is turned on. The user may adjust the accelerometer setting in a range from low to high using accelerometer adjust 413A. When an accelerometer measurement is sufficiently high, the camera is automatically turned on. Calendar event 412, sound detect 414, and email/text 415 are not selected, and therefore are turned off.

Sub-user interface 420 may be a sub-user interface containing information and interactive elements for setting the alert on changes function of a camera to automatically turn on a camera based on real-time analysis of a data. In this example, the alert on changes function is based on the front camera 118. Sub-user interface 420 includes a GPS 422, a GPS settings 423, an accelerometer 425, an accelerometer settings 426, a sound detect 427, a phrase box 428, an email/text 429, an email input 430, and a search phrase 431. In certain instances, sub-user interface 420 is associated with cross 350 ($E_1$) of FIG. 3. In these instances, settings in the user interface 420 allow or restrict the control of the front camera 118 as shown in the cross point $E_1$ of FIG. 3, using the alert on changes function settings depicted in sub-user interface 420.

Access buttons 421 of sub-user interface 420 may be a plurality of access buttons each associated with a software function that may be used to set the alert on changes function. Here again, only the access button relating to acceleration may be selected, as the selection oval corresponding to accelerometer 425 is darkened. The other access buttons 421 are not enabled, because they are not selected.

GPS 422 of sub-user interface 420 may be a software function that automatically turns on a camera based on real-time analysis of GPS data. For example, GPS 422 may be set to turn on a camera when the user device is within a certain range (e.g., 3 miles) of a certain longitude and latitude. GPS settings 423 of sub-user interface 420 may be an interactive element for inputting GPS variables. GPS settings 423 in the figure show that a distance of 3 miles, and a latitude/longitude position.

Accelerometer 425 of sub-user interface 420 may be a software function that automatically turns on a camera based on real-time analysis of accelerometer data (e.g., the change in device movement along the x, y, and z axes). For example, accelerometer 425 may be set to turn on a camera when the values for the x, y, and z directions exceed a pre-defined value for each axis. Accelerometer settings 426 of sub-user interface 420 may be an interactive element for inputting accelerometer values. Such settings 426 may include a set of dialog boxes for inputting a value for the x direction, the y direction, and the z direction.

Sound detect 427 of sub-user interface 420 may be a software function that automatically turns on a camera based on real-time analysis of an audio text for a certain phrase. Phrase box 428 of sub-user interface 420 depicts a dialog box for inputting a text phrase (e.g., "turn on camera").

Thus, the when the user device receives the text phrase "turn camera on", a camera in the user device will turn on.

Email/text 429 of sub-user interface 420 may be a software function that automatically turns on a camera based on real-time analysis of an incoming email or text message from a designated contact that contains a certain phrase. Email input 430 of sub-user interface 420 may be a dialog box for inputting an email contact (e.g., John Doe). Search phrase 431 of sub-user interface 420 may be a dialog box for inputting a text phrase (e.g., "turn camera on") to search for using real-time analysis. Thus, when this function is enabled and configured as described above, a camera in the user device would turn on when an email is received from John Doe that includes the text phrase "turn camera on." In sub-user interface 420, however, GPS 422, sound detect 427, and email/text 429 are turned off as they are not selected.

FIG. 4B illustrates additional user interfaces for displaying a plurality of sub-user interfaces for setting camera functions. Such sub-user interface 440 may contain information and interactive elements for turning a camera on or off based on a user-selected event. Here, sub-user interface 440 includes an applications list 441 and selection applications 442. Applications shown in the applications list are "FaceTime" and "Google," where "FaceTime" is selected with a yes (Y) setting, and "Google" is not selected with a no (N) setting. Applications included in a sub-user interface may include virtually any application that a user's electronic device interacts with.

When sub-user interface 440 is associated with cross 360 ($E_2$) of FIG. 3, the "camera activity" function controls front camera 118. In operation, a user may select to have front camera 118 turned on or off based on a 3rd party application. Since "FaceTime" is enabled with a yes (Y), the front camera 118 of the user's electronic device will turn on when the user's electronic device receives a call using FaceTime™. Since "Google" is disabled with a no (N), the front camera 118 of the user's electronic device will not turn on when the user's electronic device is contacted by the Google™ application.

Sub-user interface 450 may be a user interface containing information and interactive elements for turning both cameras on or off based on a user's selection of 3rd party access. In the instance, where sub-user interface 450 is associated with cross 370 ($E_3$) of FIG. 3, sub-user interface 450 configures the user's electronic device to turn on both cameras when a configured $3^{rd}$ party access is received by the user's electronic device.

Sub-user interface 450 includes a plurality of access buttons 451, an application list 452, a select applications 453 dialog boxes, a second users 454 input box, an email input 455, and a devices 456 input. Access buttons 451 are a plurality of access buttons each associated with a user's selection of a 3rd party access. Sub-user interface 450 depicts a darkened oval next to access buttons 451 that are enabled.

Application list 452 of sub-user interface 450 includes "FaceTime", and "Remote Camera" in a list of 3rd party application, and select applications 453 of Sub-user interface 450 may be used to select a desired 3rd party application that may use the cameras. Here again, 3rd party applications may be selected by setting a yes (Y) or a no (N) in the dialog boxes next to an application.

The second users 454 setting of sub-user interface 450 depict a section for displaying a list of second users that may remotely turn on the cameras. Email input 455 of sub-user interface 450 is a dialog box for inputting the email address of a second user. Devices 456 of sub-user interface 450 is a section for displaying a list of 3rd party devices that may remotely turn on the cameras. For example, when a Bluetooth™ device is enabled by selecting the Bluetooth™ trigger on selection, a Bluetooth™ device can turn the camera on by sending the user's electronic device a signal.

An example of the operation of sub-user interface 450 begins with a user selecting to allow a 3rd party application to turn front camera 118 and back camera 116 on or off by inputting yes (Y) or no (N) in a dialog boxes that correspond to the 3rd party applications. In this example, "Remote Camera" is selected (Y) and that 3rd party application is allowed to turn front camera 118 and back camera 116 off "FaceTime" is not selected (N) and the 3rd party application is not allowed to turn front camera 118 and back camera 116 on and off by changing the settings in the dialog boxes. The user may also allow another device to turn front camera 118 and back camera 116 on and off. In this example, "Bluetooth trigger" is selected, so a Bluetooth™ may control the front camera 118 and the back camera 116.

When a Bluetooth™ device is paired with the operating system and the Bluetooth™ trigger is on, the camera can be operated by the remote Bluetooth device to trigger the camera or to upload data when the camera has taken a picture. In this way, remote secondary lighting may be triggered at the same time as the flash of the handheld device. Since second users 455 is not selected, second user will not be allowed to control the cameras.

Figure 5:
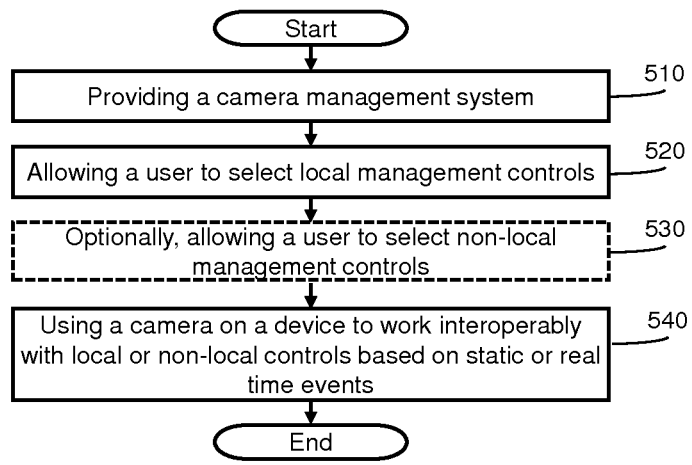
FIG. 5 is a flowchart illustrating an exemplary method for managing the cameras in the user device of FIG. 1.

FIG. 5 is a flowchart illustrating an exemplary method for managing the cameras in the user device of FIG. 1. Such method 500 may include, but is not limited to, the following steps. Step 510 involves providing a camera management system that allows a user to select camera management functions on user device 110. In certain instances, providing the camera management system may include displaying a user interface locally on the display of a user's electronic device (e.g., user device 110).

Once the camera management system is provided on user device 110, step 520 allows a user to select local management controls. In this step, a user may accesses user interface 200 via OS settings 113 and select one or more camera functions 240 for controlling the back camera 116 and the front camera 118 by inputting a yes (Y) or no (N) in back camera 247 and front camera 248 selections, respectively. Examples of local management control include, but are not limited to, Auto ON, Alert on changes, Storage and Backup, and Security.

Step 530 involves optionally allowing a user to select non-local (e.g., remote) management controls that are outside user device 110. This step may include a user selecting remote management controls using the camera activity or the 3rd party access function in camera functions 240.

Step 540 involves using a camera on user device 110 to work inter-operably with local and/or non-local (e.g., remote) controls based on static or real-time events. A static event may be a simple trigger to turn a camera on or off (e.g., a calendar event). A real-time event may be an event that is analyzed (e.g., "Alert on changes" functions shown of sub-user interface 420). Events that may also trigger the camera to turn on or off may include the electronic device receiving a trigger from an external sensor, detecting a word or phrase spoken by a person, receiving an electronic communication from an authorized source, or receiving an audio text including a word or phrase.

An electronic device can receive user selections of management control functions through a user interface that is local to the electronic device. These selections can restrict or allow operations to be initiated on the electronic device according to the settings set by the user locally on the electronic device. In certain instances, these settings allow an external electronic device to initiate operations on the electronic device remotely when the user of the external electronic device or the external electronic device itself is authorized. In certain other instances, an authorized user of an external electronic device or an authorized external electronic device may change these settings on the electronic device. Thus, steps 510 through 540 reviewed above identify events or users that are authorized, or those that are not authorized to control operations on the electronic device.

Certain embodiments of the invention may also transmit an alert to an external electronic device when an unauthorized event is changed to an authorized event in a setting of a management control function.

The figures included with this disclosure are for the purpose of illustrating the invention. The figures show aspects of one or more embodiments of the invention and are examples, the figures are not meant to limit the scope of the invention. So it should be understood that the present invention is not limited to the precise arrangements and instrumentalities shown in the figures.

Figure 6:
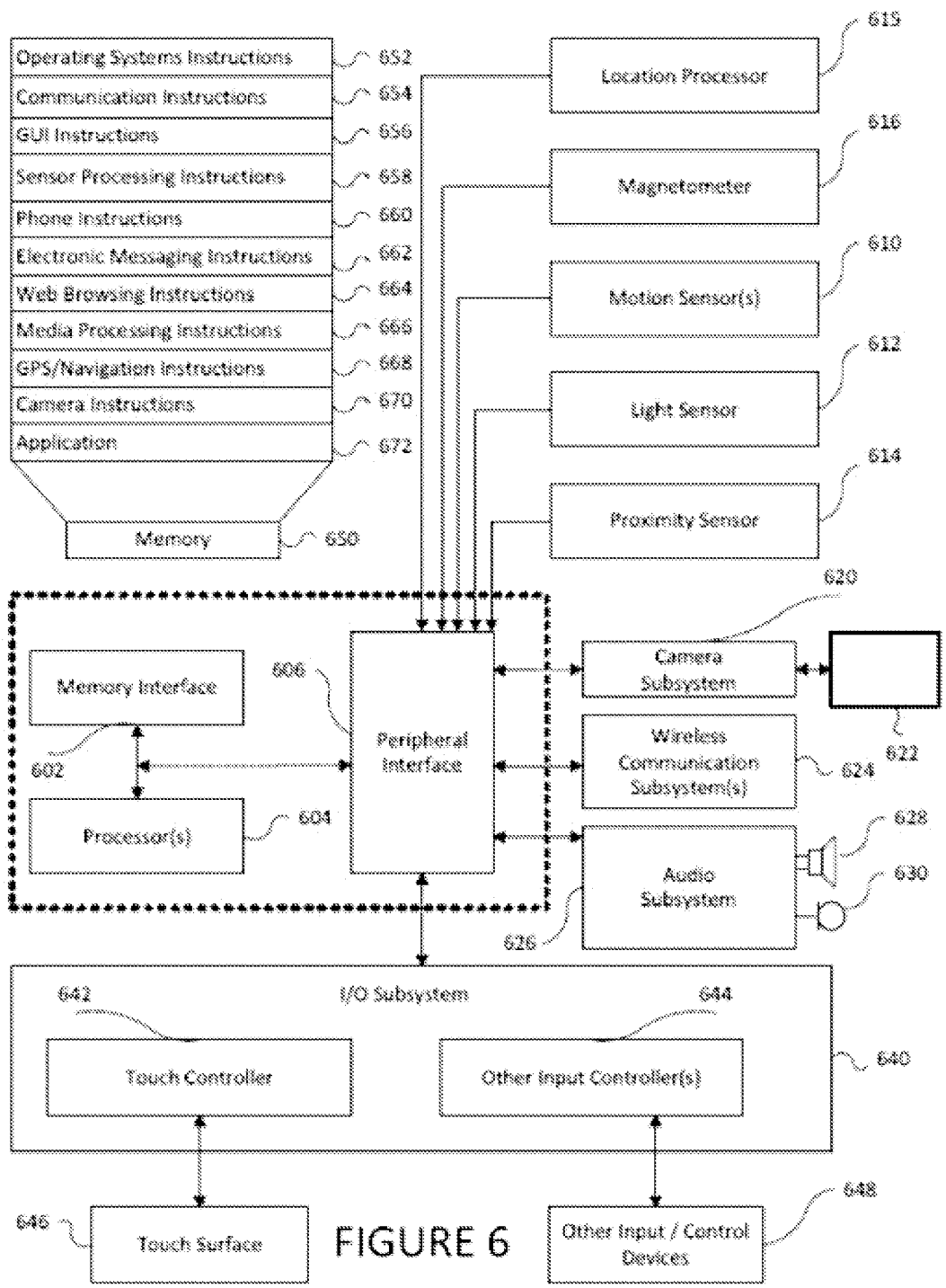
FIG. 6 illustrates a mobile device architecture that may be utilized to implement the various features and processes described herein.

FIG. 6 illustrates a mobile device architecture that may be utilized to implement the various features and processes described herein. Architecture 600 can be implemented in any number of portable devices including but not limited to smart phones, electronic tablets, and gaming devices. Architecture 600 as illustrated in FIG. 6 includes memory interface 602, processors 604, and peripheral interface 606. Memory interface 602, processors 604 and peripherals interface 606 can be separate components or can be integrated as a part of one or more integrated circuits. The various components can be coupled by one or more communication buses or signal lines.

Processors 604 as illustrated in FIG. 6 are meant to be inclusive of data processors, image processors, central processing unit, or any variety of multi-core processing devices. Any variety of sensors, external devices, and external subsystems can be coupled to peripherals interface 606 to facilitate any number of functionalities within the architecture 600 of the exemplar mobile device. For example, motion sensor 610, light sensor 612, and proximity sensor 614 can be coupled to peripherals interface 606 to facilitate orientation, lighting, and proximity functions of the mobile device. For example, light sensor 612 could be utilized to facilitate adjusting the brightness of touch surface 646. Motion sensor 610, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 606, such as a temperature sensor, a biometric sensor, or other sensing device to facilitate corresponding functionalities. Location processor 615 (e.g., a global positioning transceiver) can be coupled to peripherals interface 606 to allow for generation of geo-location data thereby facilitating geo-positioning. An electronic magnetometer 616 such as an integrated circuit chip could in turn be connected to peripherals interface 606 to provide data related to the direction of true magnetic North whereby the mobile device could enjoy compass or directional functionality. Camera subsystem 620 and an optical sensor 622 such as a charged coupled device (CCD) or a complementary metal-oxide semiconductor (CMOS) optical sensor can facilitate camera functions such as recording photographs and video clips.

Communication functionality can be facilitated through one or more communication subsystems 624, which may include one or more wireless communication subsystems. Wireless communication subsystems 624 can include 802.5 or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 624 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.5 communication networks, code division multiple access (CDMA) networks, or Bluetooth networks. Communication subsystem 624 may include hosting protocols such that the device may be configured as a base station for other wireless devices. Communication subsystems can also allow the device to synchronize with a host device using one or more protocols such as TCP/IP, HTTP, or UDP.

Audio subsystem 626 can be coupled to a speaker 628 and one or more microphones 630 to facilitate voice-enabled functions. These functions might include voice recognition, voice replication, or digital recording. Audio subsystem 626 in conjunction may also encompass traditional telephony functions.

I/O subsystem 640 may include touch controller 642 and/or other input controller(s) 644. Touch controller 642 can be coupled to a touch surface 646. Touch surface 646 and touch controller 642 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 646 may likewise be utilized. In one implementation, touch surface 646 can display virtual or soft buttons and a virtual keyboard, which can be used as an input/output device by the user.

Other input controllers 644 can be coupled to other input/control devices 648 such as one or more buttons, rocker switches, thumb-wheels, infrared ports, USB ports, and/or a pointer device such as a stylus. The one or more buttons (not shown) can include an up/down button for volume control of speaker 628 and/or microphone 630. In some implementations, device 600 can include the functionality of an audio and/or video playback or recording device and may include a pin connector for tethering to other devices.

Memory interface 602 can be coupled to memory 650. Memory 650 can include high-speed random access memory or non-volatile memory such as magnetic disk storage devices, optical storage devices, or flash memory. Memory 650 can store operating system 652, such as Darwin, RTXC, LINUX, UNIX, OS X, ANDROID, WINDOWS, or an embedded operating system such as VXWorks. Operating system 652 may include instructions for handling basic system services and for performing hardware dependent tasks. In some implementations, operating system 652 can include a kernel.

Memory 650 may also store communication instructions 654 to facilitate communicating with other mobile computing devices or servers. Communication instructions 654 can also be used to select an operational mode or communication medium for use by the device based on a geographic location, which could be obtained by the GPS/Navigation instructions 668. Memory 650 may include graphical user interface instructions 656 to facilitate graphic user interface processing such as the generation of an interface; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes, camera instructions 670 to facilitate camera-related processes and functions; and instructions 672 for any other application that may be operating on or in conjunction with the mobile computing device. Memory 650 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 650 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer may employ to access functions supporting the API. In some implementations, an API call can report to an application the capabilities of a device running the application, such as input capability, output capability, processing capability, power capability, and communications capability.

Users may use any number of different electronic user devices, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network. User devices may also be configured to access data from other storage media, such as memory cards or disk drives as may be appropriate in the case of downloaded services. User device may include standard hardware computing components such as network and media interfaces, non-transitory computer-readable storage (memory), and processors for executing instructions that may be stored in memory.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for manipulating camera control functions on an electronic device, the method comprising:
    displaying a user interface locally on the display of a remote device associated with a user, the user interface including a plurality of management control functions and a plurality of camera activities;
    receiving a first selection of management control functions from the user through the user interface local to the remote device, wherein the first selection of the management control functions:
        associates one of the management control functions with one of the camera activities from the plurality of camera activities,
        updates an authorization of a type of event,
        enables or disables one or more applications on the electronic device, and
        controls when a camera will turn on;
    verifying that the received selection from the remote device is from an authorized source of management control functions by identifying that the received selection was sent from an authorized remote device after identifying the remote device by an Internet Protocol (IP) address of the remote device;
    identifying that the selection includes a multiple word phrase that corresponds to an event;
    restricting operations of the electronic device based on the first selection; and
    performing a camera activity from the plurality of camera activities that is associated with a management control function after identifying that the selection includes the multiple word phrase that corresponds to the event, wherein the camera activity corresponds to the type of event and initiated according to the multiple word phrase authorized by the user according to the updated type of event authorization.

2. The method of claim 1, wherein the plurality of camera activities include at least one of controlling whether a light source in the electronic device is illuminated, turning the camera on after a real-time event, setting a camera setting, and sending a real-time feed from the electronic device.

3. The method of claim 1, wherein the event includes identifying that at least one of:
   a current time has reached a scheduled time,
   a location of the electronic device is within a first distance from a first location, and
   the electronic device is no longer within a second distance from a second location.

4. The method of claim 1, wherein the event includes the electronic device detecting at least one of:
   a sound decibel level reaching a threshold level, and an acceleration level reaching a threshold level.

5. The method of claim 1, wherein the event includes the electronic device receiving at least one of:
   an electronic communication from the authorized remote device,
   a trigger event from the authorized remote device identified as an sensor external to the electronic device,
   a first word or phrase spoken by a person, and
   an audio text including a second word or phrase.

6. The method of claim 1, further comprising:
   receiving a second message;
   identifying that the second message is from an unauthorized source; and
   blocking messages from the unauthorized source.

7. The method of claim 1, wherein the electronic device communicates with the remote device through the cloud.

8. The method of claim 1, wherein the remote device includes a server hosting a third party application, and wherein the third party application uses a camera in the electronic device.

9. The method of claim 8, wherein the third party application is an application that shares at least one of text, pictures, audio, and video to one or more other remote devices.

10. The method of claim 8, wherein the third party application is a backup application that copies data from the electronic device to the remote device.

11. The method of claim 8, wherein the third party application is at least one of video telephony, remote camera, social network, and cloud storage service.

12. The method of claim 1, wherein the electronic device transmits an alert to the remote device when a management control function of the plurality of management control functions changes an unauthorized event to an authorized event.

13. A non-transitory computer readable storage medium having embodied thereon a program executable by a processor to perform a method for manipulating camera control functions on an electronic device, the method comprising:
   receiving a first selection of management control functions from a user interface including a plurality of management control functions and a plurality of camera activities, the interface displayed locally on the display of a remote device associated with a user, wherein the first selection of the management control functions:
      associates one of the management control functions with one of the camera activities from the plurality of camera activities,
      updates an authorization of a type of event,
      enables or disables one or more applications on the electronic device, and
      controls when a camera will turn on;
   verifying that the received selection from the remote device is from an authorized source of management control functions by identifying that the received selection was sent from an authorized remote device after identifying the remote device by an Internet Protocol (IP) address of the remote device; identifying that the message includes a multiple word phrase in the message that corresponds to an event;
   identifying that the selection includes a multiple word phrase that corresponds to an event;
   restricting operations of the electronic device based on the first selection; and
   performing a camera activity from the plurality of camera activities that is associated with a management control function after identifying that the selection includes the multiple word phrase that corresponds to the event, wherein the camera activity corresponds to the type of event and initiated according to the multiple word phrase authorized by the user according to the updated type of event authorization.

* * * * *